United States Patent [19]
Kardashian et al.

[11] 3,774,134
[45] Nov. 20, 1973

[54] ANTISOTROPIC THIN FILM PLATED WIRE MAGNETOSTRICTIVE TRANSDUCER

[75] Inventors: Vahram S. Kardashian, Plymouth Village; Richard B. Fryer; James O. Holmen, both of Minnetonka, all of Minn.

[73] Assignee: Honeywell Inc., Minneapolis, Minn.

[22] Filed: Dec. 1, 1972

[21] Appl. No.: 311,209

[52] U.S. Cl................ 336/20, 174/126 CP, 310/26, 324/43, 336/177, 340/174 TF, 340/258
[51] Int. Cl............................................ H01f 21/00
[58] Field of Search..................... 336/20, 177, 222; 310/26; 179/110; 324/43; 340/258 R, 174 TF; 174/126 CP

[56] References Cited
UNITED STATES PATENTS

| | | |
|---|---|---|
| 2,854,593 | 9/1958 | Hobroogh............................. 310/26 |
| 3,464,042 | 8/1969 | Raman................................... 336/20 |
| 3,612,924 | 10/1971 | Semmelink........................... 310/26 |

Primary Examiner—Thomas J. Kozma
Attorney—Lamont B. Koontz et al.

[57] ABSTRACT

A magnetostrictive anisotropic thin film plated wire transducer for measurement of deformation of an plastic medium. A length of magnetostrictive plated wire is strung back-and-forth across a transducer framework, the magnetostrictive wire being sensitive to stress and strain. The transducer detects deformation of a surface or a structure generated by external changes in pressure on that surface or structure. The deforming surface either directly induces a stress in the magnetrostrictive plated wire transducer or induces a stress on it via an intermediate medium such as a fluid.

4 Claims, 3 Drawing Figures

PATENTED NOV 20 1973 3,774,134

ANTISOTROPIC THIN FILM PLATED WIRE MAGNETOSTRICTIVE TRANSDUCER

BACKGROUND OF THE INVENTION

The stress sensitive transducer comprises a length of magnetostrictive anisotropic thin film plated wire which is strung back-and-forth across a transducer framework for converting stress producing movements of the surroundings to an electrical signal. The transducer may be in contact with the earth to detect displacement or movement of the latter. The transducer may be part of a microphone where a diaphragm forms a sensitizing surface against the wire for converting acoustic energy into an electrical signal. In principle the motion to be sensed causes a deformation of the transducer framework or the surface which is transmitted to the plated wire.

The term magnetostriction is used to describe any dimensional change of a material which is associated with its magnetic behavior. Ferromagnetic bodies in particular are susceptible to dimensional changes as a result of changes in a magnetic field. In the following description, the phenomenon of interest is the converse, where change in stress on a magnetostrictive material induces a change in its magnetic behavior. These effects are described in detail in the copending application, Ser. No. 244,540 filed Apr. 17, 1972, and assigned to the same assignee as the present invention.

In operation, an alternating current, sinusoidal or otherwise, is fed into the plated wire which generates an alternating magnetic field in the permalloy plating around the circumference of the wire. The alternating magnetic field sets the magnetization vector in the plated magnetic film into oscillation. This, in turn generates an alternating electromotive force in the substrate core of the wire, which core may be copper-beryllium. The voltage output or signal is alternating and constant in amplitude. Changes in the anisotropic constant of the film result in changes in the envelope of the signal amplitude. This appears as a modulation of a carrier similar in appearance to an amplitude modulation of a radio wave carrier. The transducer output is detected, filtered through a low pass-band filter, and amplified to produce an analogue signal.

Often the magnetostrictive plated wire is contained in a flexible insulating tube or sheath, such as teflon. The wire and tubing may further lie within a metallic shielded braid which, in turn, is protected by electrical insulation. In the present invention, however, the plated wire is not in an insulting sheath but rather is uninsulated and is fastened to a framework at a plurality of points, but if the framework is electrically conductive then the wire is electrically insulated from the framework.

The output of the transducer is a function of the anisotropic field constant referred to as $H_k$ in the literature. It is also a function of the orientation of the magnetization vector. In a zero magnetostrictive anisotropic plated wire, the equilibrium orientation of the magnetization vector is determined by the component of the ambient magnetic field parallel to the hard axis of the wire. If the wire plating is also magnetostrictive, a change in $H_k$ and a reorientation of the magnetization vector can be achieved by stressing the wire. The output of a length of magnetostrictive plated wire, therefore, measures either the state of the ambient magnetic field or the state of strain to which the plated wire is subjected, or both. There is no differentiation between the phenomena in the electrical output signal produced. In a short length of magnetostrictive wire, the disturbing effect of stress upon the magnetization vector dominates the effect of ambient changes of magnetic field. In the present invention, the back-and-forth arrangement of the wire is of a nature to substantially eliminate or null out the effect of magnetic field changes so that it is responsive primarily to stress.

SUMMARY OF THE INVENTION

A length of anisotropic thin film plated wire having magnetostrictive response is strung in adjacent segments or convolutions back-and-forth across a transducer framework and is fastened to the framework at each crossover of the frame and wire. The loops of plated wire exterior of the bridge formed by the framework are deplated and thereby rendered inactive so that the stress sensitive active portions of the wire are those segments within the framework.

DESCRIPTION

Figure 1:
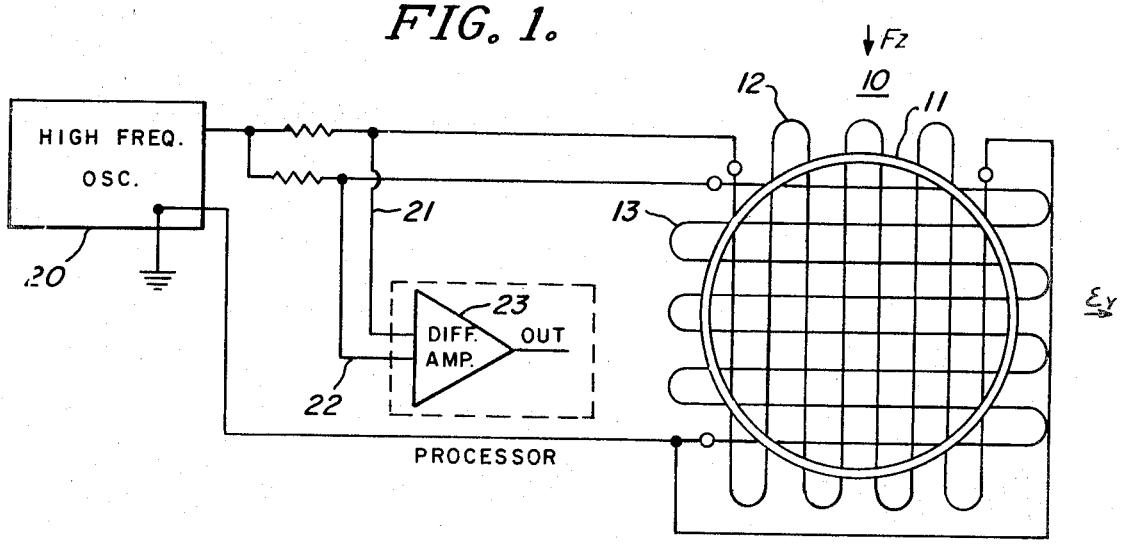
FIG. 1 is a diagrammatic representation of one embodiment of the transducer shown together with a block diagram of the system with which it operates.

Referring now to the drawing and in particular to FIG. 1 there is disclosed a transducer 10 comprising a ring like framework 11 having plated wires 12 and 13 anchored to the ring structure. The framework is a semi rigid device and may be of a nonconductive material such as glass or a conductive material such as the plated wire substrate. The latter minimizes relative stress between wire and frame because of equal coefficients of expansion.

The anisotropic plated wires 12 and 13 may be, for example, a 10 mil diameter beryllium-copper substrate wire which has been plated with an anisotropic magnetic permalloy film. During deposition of the ferromagnetic film, a magnetic field is applied so that a preferred axis, called the easy axis, is obtained which is oriented circumferentially about the wire or with some degree of skew. The magnetization vector may lie along this line in the absence of external fields and strain on the wire, and makes a loop of magnetic flux around the wire.

In the Kardashian U.S. Pat. No. 3,657,641, assigned to the same assignee as the present invention, there is described in more detail anisotropic thin film plated wire of this nature. In that patent the permalloy film is described as being of approximate composition of 80% Ni and 20% Fe, which composition has a low or zero magnetostrictive effect. In the present invention which is a strain detector and which depends on the magnetostrictive response of the wire, it is desirable rather to enhance the magnetostrictive effect. The magnetostrictive coefficient may be positive or negative, the degree of magnetostriction being determined by the application. Thus the wire may have a nickel rich plating composition, Ni content greater than 80 percent and have negative magnetostriction, or on the other hand may have an iron rich plating composition, the Fe content greater than 20% and have positive magnetostriction.

An alternating current, such as from a high frequency sine wave oscillator 20, is fed to the plated wires 12 and 13 and in each generates an alternating magnetic field in the permalloy deposit around the circumference of the wire. The sine wave oscillator 20 which preferably is a high frequency, is connected in energizing or driving relation to the wires 12 and 13, the wires 12 and 13 being energized in parallel. The AC magnetic field sets the magnetization vector in the plating into oscillation. This, in turn, generates an AC electromotive force in the Cu-Be core of the wire. The EMF output is alternating and constant in amplitude. For a given wire, this output is a function of the equilibrium orientation of the magnetization vector, $\vec{M}$, the drive field amplitude, and frequency, and the $H_k$ value of the wire. Changes in the $H_k$ value or changes in the orientation of $\vec{M}$ result in changes in the alternating signal amplitude. When the output is envelope detected, the change appears as a modulation of a carrier similar to an amplitude modulated radio wave carrier.

The two output conductors 21 and 22 are connected to the input of a differential amplifier 23 in a processor. The processor also contains a detector, a conventional low passband filter and amplifier such that the signal from the differential amplifier is detected, filtered through the low passband filter and amplified to produce an analogue signal in the processor.

Figure 2:
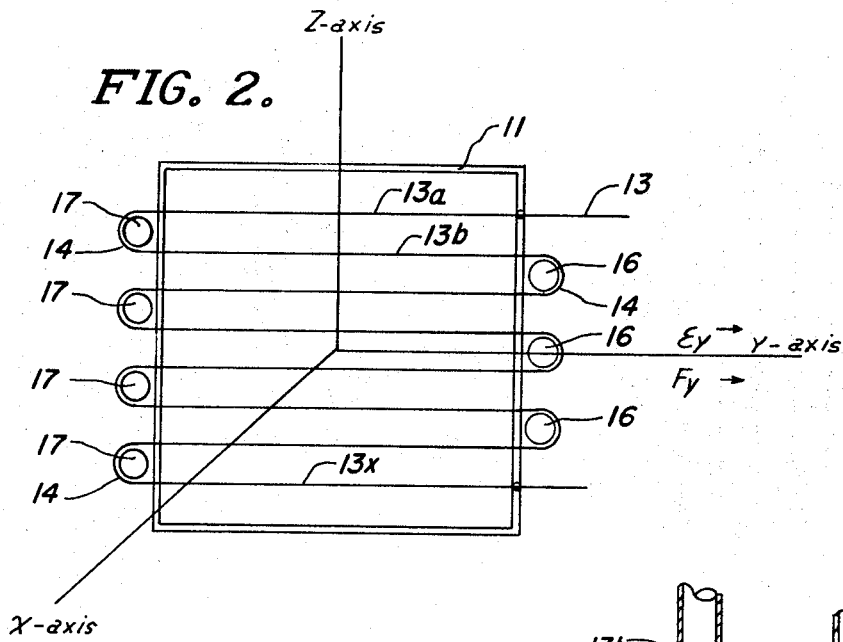
FIG. 2 shows another embodiment of the transducer and a detail of the method of fabricating the transducer; and, FIG. 3 shows a detail of a section of the transducer of FIGS. 1 or 2.

In FIG. 2 the transducer is shown in an elementary form wherein a length of anisotropic plated wire 13 is strung back-and-forth across the rectangular frame 11, the segments of wire lying parallel to one another in a plane. To minimize effects of magnetic fields the segments should be an even number and/or the transducer may be magnetically shielded. The frame need not be rectangular, it may just as easily be in a ring like form. The convolutions of the plated wire 13a, 13b etc. to 13x are preferably stretched across a form and the folded segments 14 of the wire are deplated. That is to say the portions of the plated wire external to the frame 11 have their magnetic property annealed out or their permalloy layer etched away. Only the segments within the frame 11 retain the desired magnetic properties of anisotropy and magnetostriction. There should be an even number of convolutions so that the magnetic effects will tend to cancel out. After the deplating of the folds 14, the frame 11 is brought in contact with the plurality of wire convolutions and the wire is bonded or anchored to the frame at each intersection by epoxy or solder or the like. The form supporting the wires can then be removed. The transducer of FIG. 1 is basically similar to FIG. 2 except that two plated wires 12 and 13 are used at right angles to one another and are isolated from one another.

Figure 3:
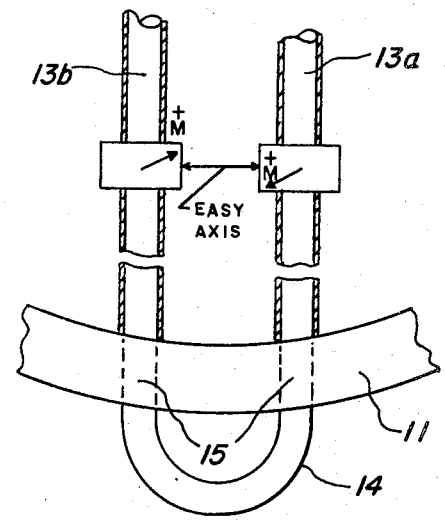

FIG. 3 is a magnified view of a portion of the transducer and shows sections of two adjacent segments 13a and 13b of magnetostrictive plated wire anchored to the frame 11. It will be noted that the deplated end 14 of the wire 13 extends to include the area of anchoring or bonding 15. The deplating of the area 14 is an important feature of the construction of the transducer since the stress caused by the bonding and the 180° bend of plated wire between segments may generate an unwanted signal large enough to swamp out any stress signals.

In FIG. 1, consider the effect of a compressive force in the Z-axis, $F_z$. $F_z$ results in an elongation of the frame structure by an amount $\epsilon_y$ in the Y-direction which alters the $H_k$ value of the wire. Also in FIG. 1, deformation $\epsilon_y$ and $\epsilon_z$ generate in the two wires strains of opposite polarity as well as changes in their respective $H_k$. The output of the wires are observed differentially.

A change in the magnetic field, on the other hand, is capable of reorienting the magnetization vector to a new equilibrium orientation. Although the effect may be small relative to the dominant stress effect, nevertheless, it is desirable to design a transducer which will null out magnetic field induced outputs. Both the transducer configurations of FIG. 1 and 2 essentially perform this function.

Consider two adjacent segments of plated wire in FIG. 3, where a section of the plating is shown peeled from the wire. Assume the equilibrium orientations of the magnetization vectors in each of the segments, due to skew, are directed as shown, and form a helical configuration around the wire. For a magnetostrictive anisotropic permalloy deposit, a stress which alters the $H_k$ value causes the voltage output of adjacent segments to sum up. If the $\vec{M}$ vector equilibrium orientation is altered by a magnetic field, the $\vec{M}$ vectors in adjacent segments are driven toward and away from their respective circumferential directions causing the outputs of adjacent segments to tend to null out.

The device can also be made sensitive to forces on the wires acting parallel to the X-axis, i.e. perpendicular to the axis of the wires. Such a force will generate tension in the wire which will induce an output from the plated wire.

A means of generating a force along the X-axis is by a diaphragm stretched over the frame number 11, where the diaphragm is made to respond elastically to external changes in pressure on its surface. The diaphragm may be set in motion by variations in gas pressure as in barometers and microphones, or by a fluidic displacement as in flowmeter or pressure sensors.

For measurement of X-axis forces, the configuration of FIG. 1 requires that the magnetostriction coefficients of the Y-parallel and Z-parallel wires be different. For the measurement of Y-axis or Z-axis forces, the magnetostriction coefficients are the same.

A method of constructing the transducer is described below. An extended length of the plated wire is strung back-and-forth around spaced pins 16 adn 17 of a jig or the like as shown in FIG. 2. The result is that the wire is folded back-and-forth forming a number of essentially parallel segments or convolutions. The magnetostrictive wire is responsive to deformation of any type and a severe stress occurs at each bend of the wire 14 where the plated wire passes around a pin 17 or 16 and reverses direction and also at the points where the plated wire is anchored or bonded to the frame. These plurality of severe stresses of the plated wire would likely cause a disturbing effect tending to mask any further stress which should be detected. The folded sections of the wire convolutions must therefore be made nonmagnetostrictive or non-responsive to stress. The folded sections of the wire are exposed to a deplating agent, for example, by dipping the jig including pins 16 and the adjacent wire into a deplating bath and then reversing the jig dipping pins 17 and the adjacent wire into the deplating bath. FIG. 3 shows a section 14 of the wire 13 which has been deplated at the bend and at the area where the wire is secured or bonded to the frame. The deplated U shaped portions of the wire are thus desensitized and are not responsive to the stressed condition. The convoluted wire on the form and the frame 11 are then brought together and the wire anchored or secured to the frame at each crossover by soldering or cementing or the like. The completed transducer is then removed from the jig pins.

The embodiments of the invention in which an exclusive property or right is claimed are defined as follows:

1. A magnetostrictive transducer structure comprising:

a transducer frame;

an extended length of anisotropic magnetic film plated wire having magnetostrictive properties, said wire being strung back-and-forth across said transducer frame in a plurality of adjacent convolutions;

means securing said plated wire to said frame at each intersection of wire and frame;

a pair of terminals connected to the ends of said plated wire for connection to suitable energizing and sensing means;

and said convoluted plated wire having a deplated section at the folded portions of each convolution including the section of each convolution secured to said frame.

2. The invention according to claim 1 wherein said plated wire has a core of beryllium-copper and a magnetostrictive anisotropic magnetic plating of nickel-iron.

3. The invention according to claim 2 wherein the composition of the plating deviates from the zero magnetostrictive composition of approximately 80 percent nickel and 20 percent iron.

4. The invention according to claim 1 in which the adjacent convolutions are parallel one to the other.

* * * * *